Figure 1:
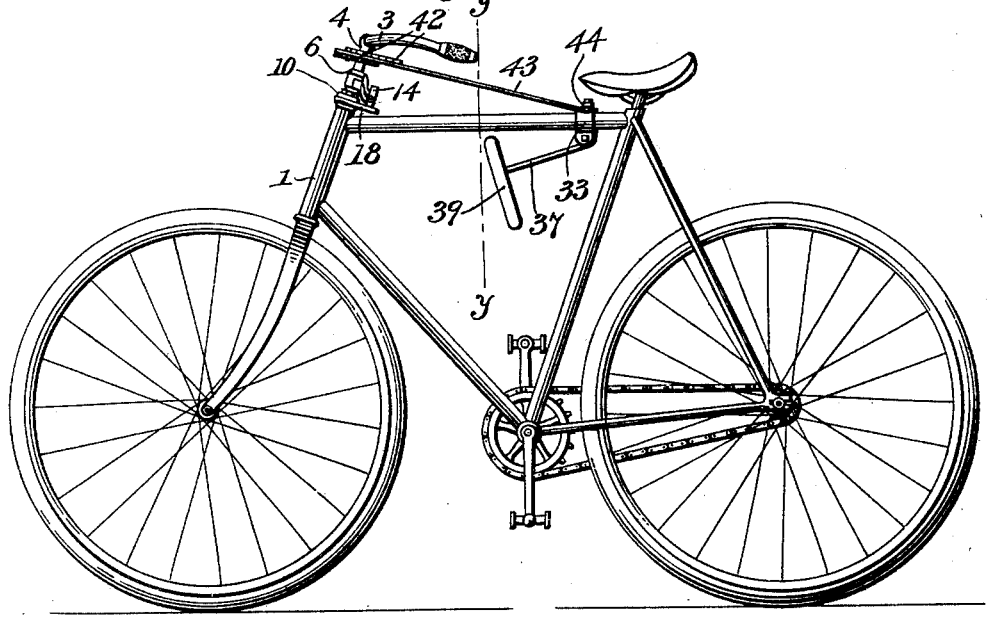

No. 679,688. Patented July 30, 1901.
W. W. SMALL.
STEERING DEVICE.
(Application filed Nov. 8, 1899.)
(No Model.) 2 Sheets—Sheet 1.

Witnesses
Edwin G. McKee.
R. M. Smith.

Walter W. Small Inventor
By C. G. Siggers Attorney

THE NORRIS PETERS CO., PHOTO-LITHO., WASHINGTON, D. C.

No. 679,688. Patented July 30, 1901.
W. W. SMALL.
STEERING DEVICE.
(Application filed Nov. 8, 1899.)
(No Model.) 2 Sheets—Sheet 2.

Witnesses
Edwin G. McKee.
R. M. Smith.

Walter W. Small Inventor
By E. G. Siggers Attorney

UNITED STATES PATENT OFFICE.

WALTER W. SMALL, OF CHERRYFIELD, MAINE.

STEERING DEVICE.

SPECIFICATION forming part of Letters Patent No. 679,688, dated July 30, 1901.

Application filed November 8, 1899. Serial No. 736,271. (No model.)

*To all whom it may concern:*

Be it known that I, WALTER W. SMALL, a citizen of the United States, residing at Cherryfield, in the county of Washington and State of Maine, have invented a new and useful Steering Device, of which the following is a specification.

This invention relates to steering devices, the object in view being to provide mechanism whereby the steering-head of a vehicle may be normally held rigid or stationary with relation to the vehicle or machine frame either while the vehicle or machine is in motion or at a standstill. In connection with a steering device a trip device is employed, which will serve to throw out of operation the holding or clutch portion of the mechanism, so as to allow the vehicle or machine to be steered.

The detailed objects and advantages of the invention will appear in full in the course of the ensuing description.

The invention consists in a steering device embodying certain novel features and details of construction and arrangements of parts, as hereinafter fully described, illustrated in the drawings, and incorporated in the claims.

Figure 2:
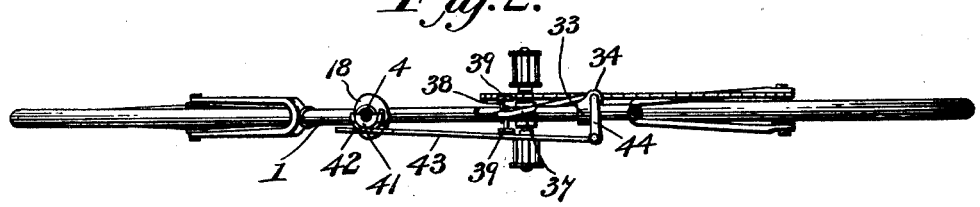
Figure 3:
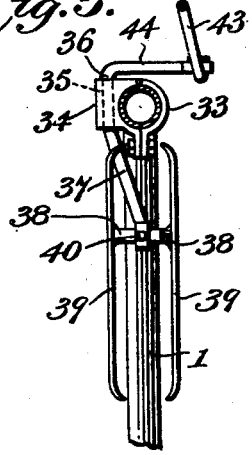
Figure 4:
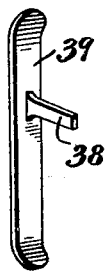
Figure 5:
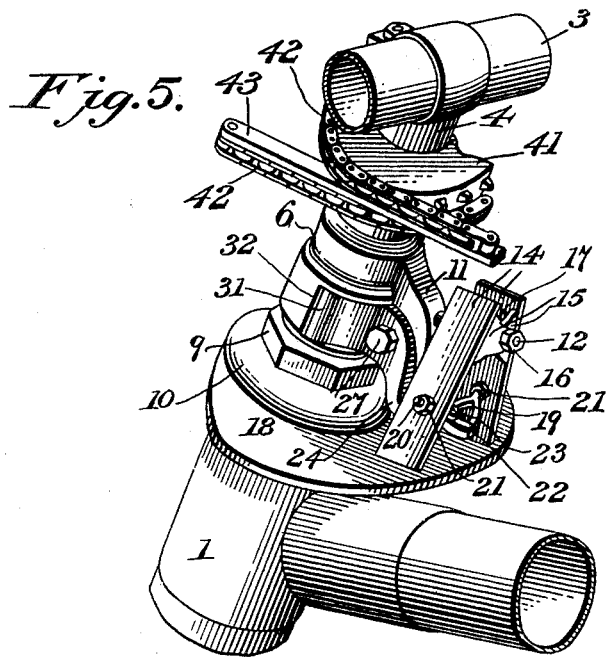
Figure 6:
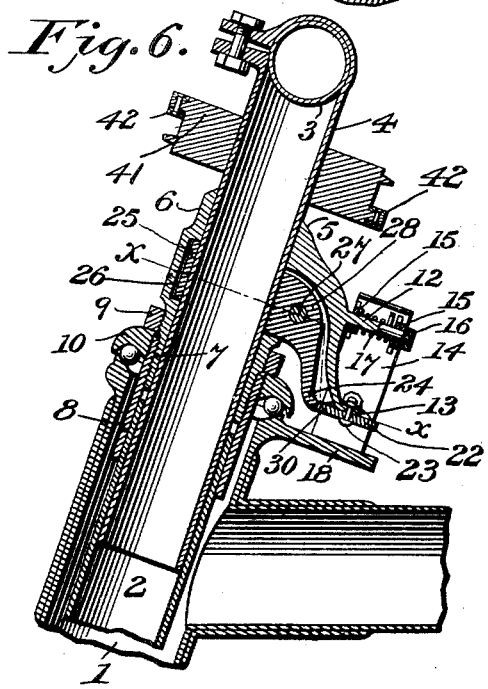
Figure 7:
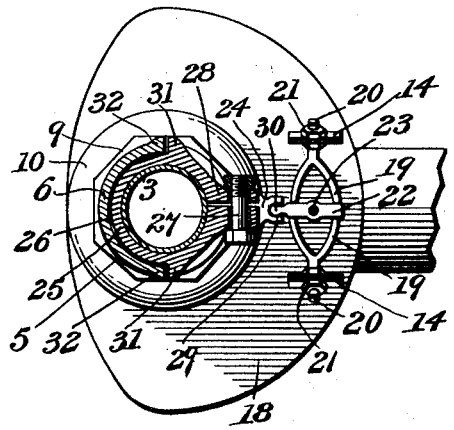

In the accompanying drawings, Figure 1 is a side elevation of a bicycle, showing the improved steering device and the operating means therefor. Fig. 2 is a plan view of the same, partly broken away. Fig. 3 is a cross-section taken on the line $y\,y$ of Fig. 1. Fig. 4 is a detail perspective view of one of the knee-plates. Fig. 5 is a perspective view illustrating operating mechanism for the steering device adapted to be controlled by the knees or legs of the rider. Fig. 6 is a vertical longitudinal section through the same. Fig. 7 is a cross-section taken on the line X X of Fig. 6.

Similar numerals of reference designate corresponding parts in the different figures of the drawings.

For convenience in disclosing the nature of this invention the mechanism is illustrated and will be described as applied to an ordinary bicycle of the type now in use; but it is to be understood that the invention hereinafter described in detail is applicable to and adapted for use in connection with vehicles of all descriptions in which a steering wheel or runner is employed and wherein such steering wheel or runner is adapted to be turned or deflected for the purpose of steering the machine.

In the drawings, 1 designates the head-tube of a bicycle, 2 the fork-stem in which the front or steering wheel is mounted, 3 the handle-bar, and 4 the handle-bar stem, the said parts being of the usual construction and combined in the usual manner, with the exception that the handle-bar stem 4 is mounted loosely in the fork-stem 2, so that there may be a free relative movement between said parts except as such movement is controlled by the device hereinafter described.

In carrying out the present invention a bracket 5 is employed, which comprises a sleeve portion 6, which embraces the handle-bar stem 4. The lower end of the sleeve 6 is exteriorly threaded, as at 7, and screwed firmly down into the upper end of the fork-stem 2 or coupled rigidly thereto by means of a coupling-sleeve 8. In order to prevent said parts from becoming loose, a jam or lock nut 9, surrounding the threaded portion of the sleeve 6, is screwed down against the ordinary ball-cup 10, carried by the upper end of the fork-stem 2. The construction and arrangement of parts last referred to need not be the same as illustrated in the drawings, the only essential feature being that the bracket 5 must be rigidly connected to the fork-stem 2, so as to form a part thereof, in effect, the said bracket 5 turning or moving with the fork-stem 2 and the steering-wheel as the latter is turned in one direction or the other for guiding the machine.

The bracket 5 is provided in rear of the handle-bar stem with a bracket-arm 11, which is branched to form a spindle 12 and a foot 13. Pivotally mounted on the spindle 12 is a pair of clutch-dogs 14, each of which is provided near its upper end with parallel ears 15, having openings through which the spindle 12 passes. The ears 15 overlap each other, as shown in the drawings, and the dogs are held on the spindle by means of a nut or other suitable fastening device 16. Disposed around the spindle 12 between the ears 15 is a coiled spring 17, the terminals of which extend upward and bear against the inner surfaces of the dogs above the spindle, the tension of the spring being thus exerted to force apart the upper ends of the dogs and correspondingly urge the lower ends of the dogs toward each other. The lower ends of the clutch-dogs are thus caused to come in contact with a clutch-plate 18, in the form of a ledge projecting at right angles to the axis of the handle-bar stem and forming a segmental extension of the head-tube 1 of the machine-frame. Each of the dogs is provided near its lower free end and upon its inner side with a bifurcated extension or foot 19. This extension or foot may be formed integrally with the dog, but for convenience is preferably formed in a separate piece and provided with the threaded shank 20, which passes through the body of the dog and is held by means of one or more nuts 21. The extremities of the extensions lie upon opposite sides of a trip-lever 22, which is fulcrumed intermediate its ends on a stud 23, carried by the foot extension 13 of the bracket-arm 11. The bifurcated portions of each extension 19 come in contact with both arms of the lever 22, so that one of the branches of the extension 19 will be operated upon by the lever no matter which way the lever is vibrated. When the lever operates upon the extension 19 it serves to throw outward and tilt upward the lower end of the dog, thus throwing the same out of engagement with the clutch-plate 18, and by the arrangement shown and described both of the clutch-dogs will be simultaneously thrown out of engagement with the clutch-plate in whichever direction the lever 32 is vibrated.

In order to operate the trip-lever, a trip-arm 24 is employed, said arm having a split sleeve or band portion 25, which encircles the handle-bar stem 4 and which is received in a recess 26, formed in the inner surface of the bracket 5, as clearly shown in Figs. 2 and 3. The sleeve or band 25 is clamped firmly and fixedly upon the handle-bar stem 4 by means of a clamping screw or bolt 27, passing through the split portions 28 of said sleeve. The trip-arm 24 at its projecting end is provided with a socket 29, in which is received the ball-shaped head or extremity 30 of the trip-lever 22, whereby the trip-arm when moved laterally to one side or the other will rock the trip-lever 22 on its fulcrum 23. The trip-arm 24 is provided on opposite sides with laterally-projecting shoulders 31, which come in contact and coöperate with correspondingly-located shoulders 32 on the bracket 5. Sufficient space is left between the shoulders 30 and 31 to admit of a limited amount of free relative movement between the bracket-arm and trip-arm for the purpose of rocking the trip-lever and disengaging the clutch-dogs from the clutch-plate. This will permit the dogs to be disengaged from the clutch-plate and allow the steering-head to be turned for guiding the machine. Just as the engaging portions of the clutch-dogs move out of contact with the clutch-plate 18 the shoulders 32 and 31 coöperate at one side or the other of the handle-stem, according to the direction in which the handle-bar is turned, and the handle-bar stem 4 thus takes up and turns the fork-stem 2 with it. It will thus be seen that the clutch device is so combined with the vehicle-frame and steering-wheel frame that it acts normally to hold said frames relatively rigid. At the same time by turning the handle-bar the clutch device is tripped or thrown out of operation, thus allowing the machine to be steered just as easily as though the clutch device were not present.

I associate with the steering device hereinabove described operating mechanism adapted to be controlled by the knees or legs of the rider, whose hands are thus left free. The knee-operating mechanism comprises a clip 33, which is mounted upon the upper run of the bicycle, as shown in Fig. 1, which clip is provided with a lateral extension 34, in which is formed a vertical opening 35 for the reception of a rock-shaft 36. The rock-shaft 36 is provided at its lower end with a forwardly-projecting arm 37, the end of which is provided with a transverse opening to receive the stems 38 of a pair of knee-plates 39, the stems being secured in place by means of a binding-screw 40, passing through the end of the arm 37 and bearing against said stems. The plates extend upward and downward, and are slightly inclined to approximate the path of movement of the rider's knees, so that the knees may be pressed against the knee-plates, either in the elevated or depressed position of the knees.

Mounted fast upon the handle-bar stem 4 is a sector 41, projecting from one side of the stem, as shown in Figs. 2 and 5. Connected to the end portions of the sector 41 are the extremities of a pair of chains 42, which lie against the periphery of the sector and have their opposite ends connected to an operating-rod 43, which extends alongside of the handle-bar stem, projecting slightly in advance thereof and also rearward far enough to connect pivotally with an arm 44 at the upper end of the rock-shaft 36.

It will be seen that the rider by pressing his knees against the knee-plates 39 may swing the lever 37 to one side or the other, thereby rocking the shaft 36 and vibrating the upper arm 44 of the rock-shaft, which, being pivotally connected to the operating-rod 43, enables the latter, through the medium of the chains or other flexible connections 42 and sector 41, to turn the handle-bars 3, and consequently the steering-wheel of the machine, in either direction. When it is so turned, the clutch-dogs are thrown out of engagement with the clutch-plate, thus enabling the machine to be steered at the will of the rider. The distance between the knee-plates 39 may be adjusted by means of the binding-screw 40.

It is to be observed that the knee-operated steering device is combined with the stem heretofore described as the "handle-bar stem," which stem is equipped with the usual handle-bar. The stem is thus common to the handle-bar and the knee-operated device, and it serves the primary purpose of a steering-stem, because it is in operative relation to the fork-stem and has operative connections with the clutch mechanism. Said stem is thus adapted to serve as the means for operating the fork-stem through the handle-bar or the knee-operated devices, and I will designate this stem generically as the "steering-stem" of my improvement. This steering-stem is normally in loose relation to the fork-stem for the purpose of permitting the clutch device to maintain the fork-stem at any fixed relation to the frame of the machine. Said steering-stem is, however, equipped with means which permit said steering-stem to have a limited rotative movement with respect to the fork-stem; but said means is operable at the termination of the limited rotative movement of the steering-stem to rigidly connect or interlock the steering-stem with the fork-stem. Such coupling or interlocking means consist, in the preferred embodiment of the invention, of the sleeve having the shoulders 31, which are in spaced relation to the shoulders 32 on the band or sleeve 6, and it is to be observed by reference to Fig. 7 that the shoulders 31 in the normal position of the steering-stem are spaced with relation to and out of engagement with the shoulders 32 on the sleeve 6. This permits the steering-stem to have the desired limited rotative movement with respect to the fork-stem; but when the steering-stem shall have been moved a certain distance in either direction one or the other of the shoulders 31 engages with the adjacent shoulder 32, so as to interlock the two stems, or, in other words, make the steering-stem fast with the fork-stem, so as to insure the turning of the fork-stem with the steering-stem.

One of the important features of my invention resides in the construction of the parts controlled by the rotative movement of the steering-stem and adapted for the operation of the clutch, which makes the fork-stem fast with the machine-frame. The peculiarity in this construction between the steering-stem and the clutch mechanism resides in the fact that such construction or connection is operable prior to the engagement of one of the shoulders 31 on the steering-stem with a shoulder 32 on the sleeve or band that is fast with the fork-stem.

From the foregoing it is thought that the construction, operation, and advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described the invention, what is claimed as new, and desired to be secured by Letters Patent, is—

1. The combination with a frame, and a fork-stem, of a bracket-arm fast with said stem, a steering-stem loosely fitted to the fork-stem, means carried jointly by the stems for interlocking the two stems and also permitting the steering-stem to have an independent limited rotative movement, and a clutch mechanism carried in part by the bracket and separate from the interlocking means, said clutch mechanism being operative by the steering-stem and normally making the fork-stem fast with the frame, as set forth.

2. The combination with a frame, and a fork-stem, of a clutch means normally holding the fork-stem fast with the frame, and a steering-stem connected with the fork-stem and having actuating means for releasing the fork-stem-locking means previous to an interlocking engagement between the two stems, and means separate from, and independent of, the clutch means, for effecting said interlocking engagement, as set forth.

3. The combination with a frame, and a fork-stem, of a clutch-plate fast with said frame, a steering-stem capable of a limited rotative movement with respect to the fork-stem and having means for securing an interlocking engagement therewith, a bracket-arm carried by the fork-stem, the inclined clutch-dogs mounted on the bracket-arm and engaging individually with the clutch-plate, and means arranged for operation by the steering-stem to release the clutch-dogs from the clutch-plate, substantially as described.

4. The combination with a frame, and a fork-stem, of a clutch-plate fast with said frame, a steering-stem capable of a limited rotating movement with respect to the fork-stem, means carried jointly by the stems for securing their interlocking engagement, a bracket-arm carried by the fork-stem, clutch-dogs pivoted individually on said bracket-arm, a spring engaging with both clutch-dogs and normally holding the latter in fast engagement with the clutch-plate, and a tripping device actuated by a rotative movement of the steering-stem and engaging operatively with the clutch-dogs to individually release the latter from the clutch-plate, as set forth.

5. The combination with the fork-stem of a bicycle, and a bracket rigidly connected thereto, of a steering-stem having a limited rotative movement with relation to the fork-stem, a trip-arm fast on the handle-bar stem, a stationary clutch-plate on the machine-frame, a clutch-dog operatively mounted on said bracket and located in operative relation to said trip-arm, means operative by the trip-arm on the rotative movement of the handle-bar stem to release the clutch-dog, and means independent of the clutch mechanism for interlocking the stems, substantially as described.

6. The combination with the fork-stem of a bicycle, of a steering-stem having a limited amount of rotative movement relatively thereto, a bracket fast with the fork-stem, a stationary clutch-plate on the machine-frame, a pair of clutch-dogs operatively mounted on said bracket to engage the clutch-plate, a trip-lever arranged to simultaneously engage both dogs, and a trip-arm fast on the steering-stem and operatively engaged with said trip-lever, substantially as described.

7. The combination with the fork-stem of a bicycle, of a steering-stem having a limited rotative movement relatively thereto, a stationary clutch-plate on the machine-frame, a bracket-arm fast with the fork-stem, clutch-dogs carried by said arm for engagement with the clutch-plate, bifurcated extensions carried by said dogs, a trip-lever mounted between said extensions, and a trip-arm fast on the steering-stem and operatively connected with said trip-lever, substantially as described.

8. The combination with a fork-stem, of a steering-stem having a limited rotative movement with respect to the fork-stem, means for interlocking the steering-stem and the fork-stem at the termination in either direction of the limited rotative movement of the steering-stem, a clutch separate from, and independent of, said interlocking means for holding the fork-stem against rotation, and means operative by and during the limited rotative movement of the steering-stem to release the clutch immediately before the stems are interlocked, as and for the purposes set forth.

9. In a bicycle, in combination, a fork-stem, a steering-stem having a limited amount of free rotative movement relatively thereto, a bracket-arm rigid on the fork-stem, a stationary clutch-plate on the machine-frame, a pair of clutch-dogs journaled on said bracket-arm, a trip-lever fulcrumed on said arm and arranged in operative relation to said dogs, and a trip-arm fast on the steering-stem, substantially as specified.

10. The combination with the fork-stem of a bicycle, of a steering-stem having a limited rotative movement relative thereto, a stationary clutch-plate on the machine-frame, a bracket rigid with the fork-stem, and provided with an interior groove, a pair of clutch-dogs mounted upon said bracket and arranged to engage the clutch-plate, a trip-lever mounted between the dogs, and a trip-arm for said lever encircling the steering-stem and housed in the internal groove of the bracket, substantially as described.

11. The combination with a frame, a fork-stem and a steering-stem loosely fitted to the fork-stem, of shoulders extending directly from each of said stems and designed to engage at the termination of a slight independent movement of the steering-stem, a clutch-plate rigid with the frame, a movable clutch member carried by the fork-stem, means for yieldingly urging the clutch member into frictional contact with the plate, and means carried by the steering-stem and operated during the independent movement thereof to urge the clutch member out of contact with the plate immediately before the shoulders are brought into contact to interlock the stems.

In testimony that I claim the foregoing as my own I have hereto affixed my signature in the presence of two witnesses.

WALTER W. SMALL.

Witnesses:
JAMES BURROUGHS,
E. H. STEWART.